Aug. 6, 1946.   H. H. TALBOYS   2,405,468
FOUNDRY CUTOFF MACHINE
Filed Jan. 28, 1943   8 Sheets-Sheet 6
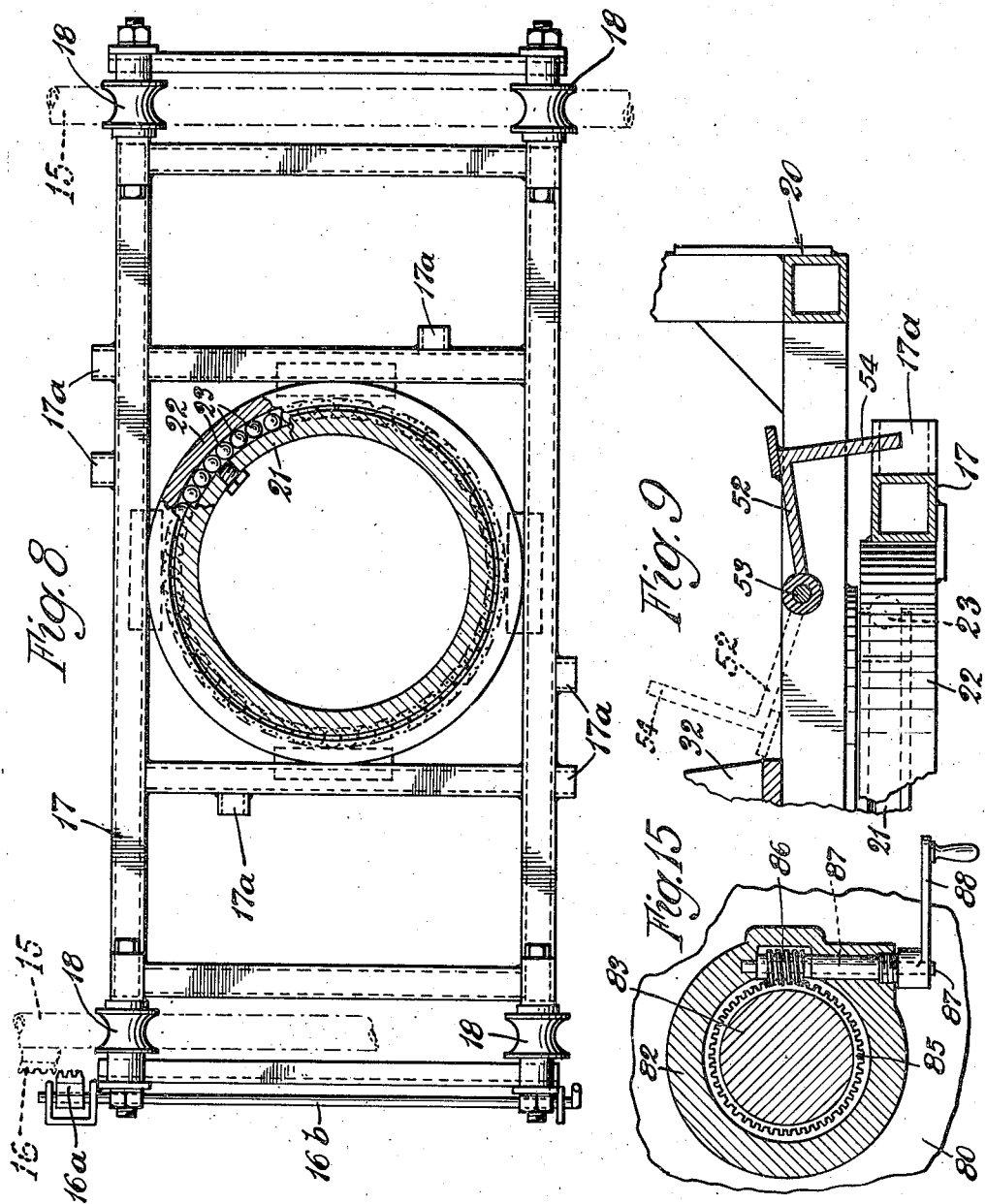
Inventor
Henry H. Talboys
by Reber & Carter
Attorneys Aug. 6, 1946.  H. H. TALBOYS  2,405,468
FOUNDRY CUTOFF MACHINE
Filed Jan. 28, 1943  8 Sheets-Sheet 7
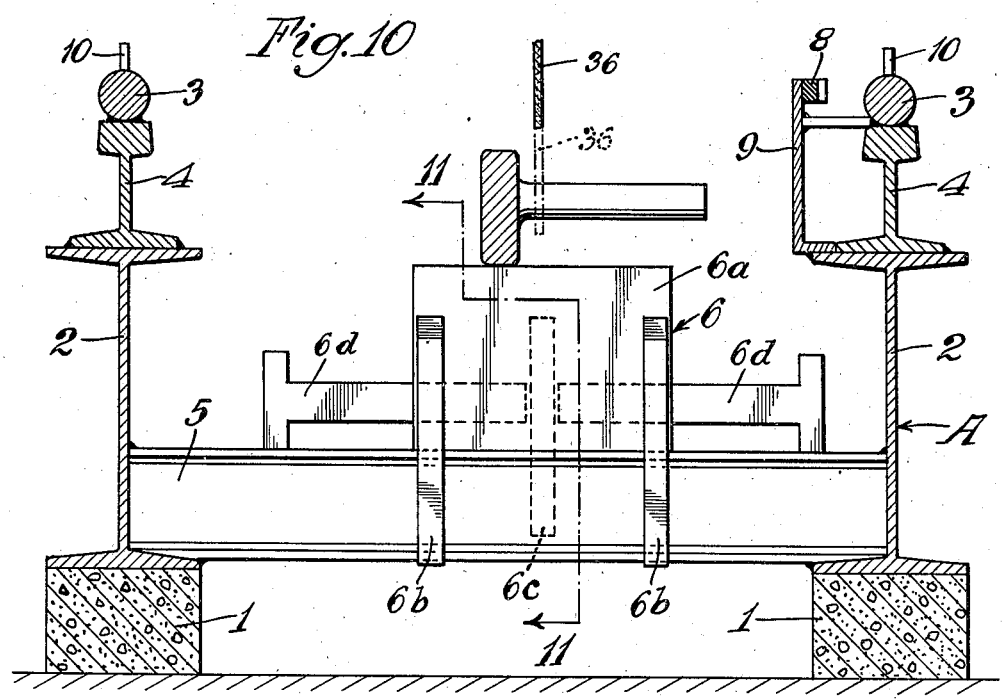
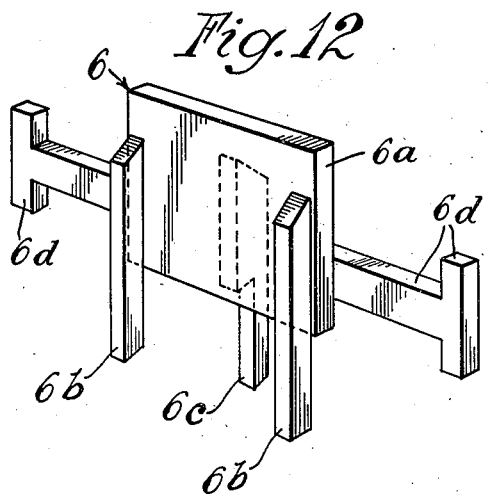
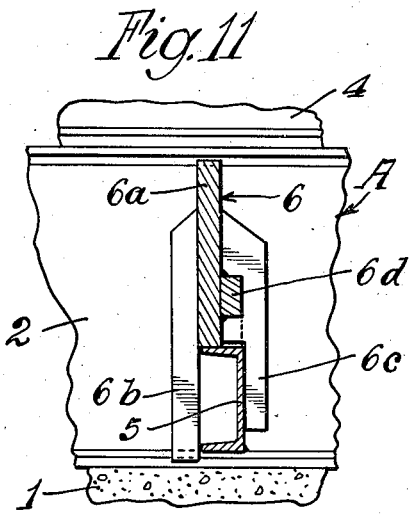
Inventor
Henry H. Talboys
by Parker & Carter
Attorneys Aug. 6, 1946.    H. H. TALBOYS    2,405,468
FOUNDRY CUTOFF MACHINE
Filed Jan. 28, 1943    8 Sheets-Sheet 8

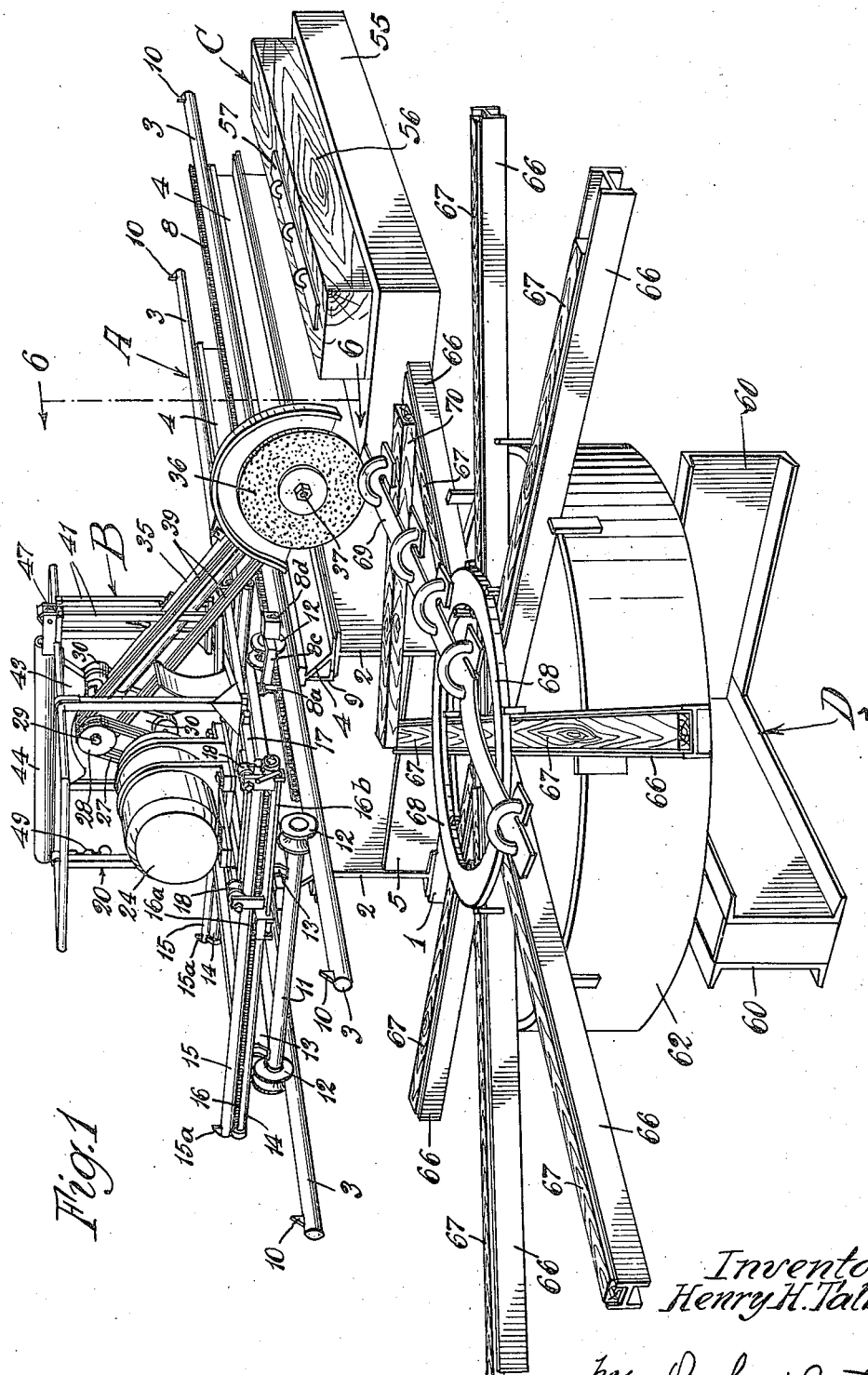

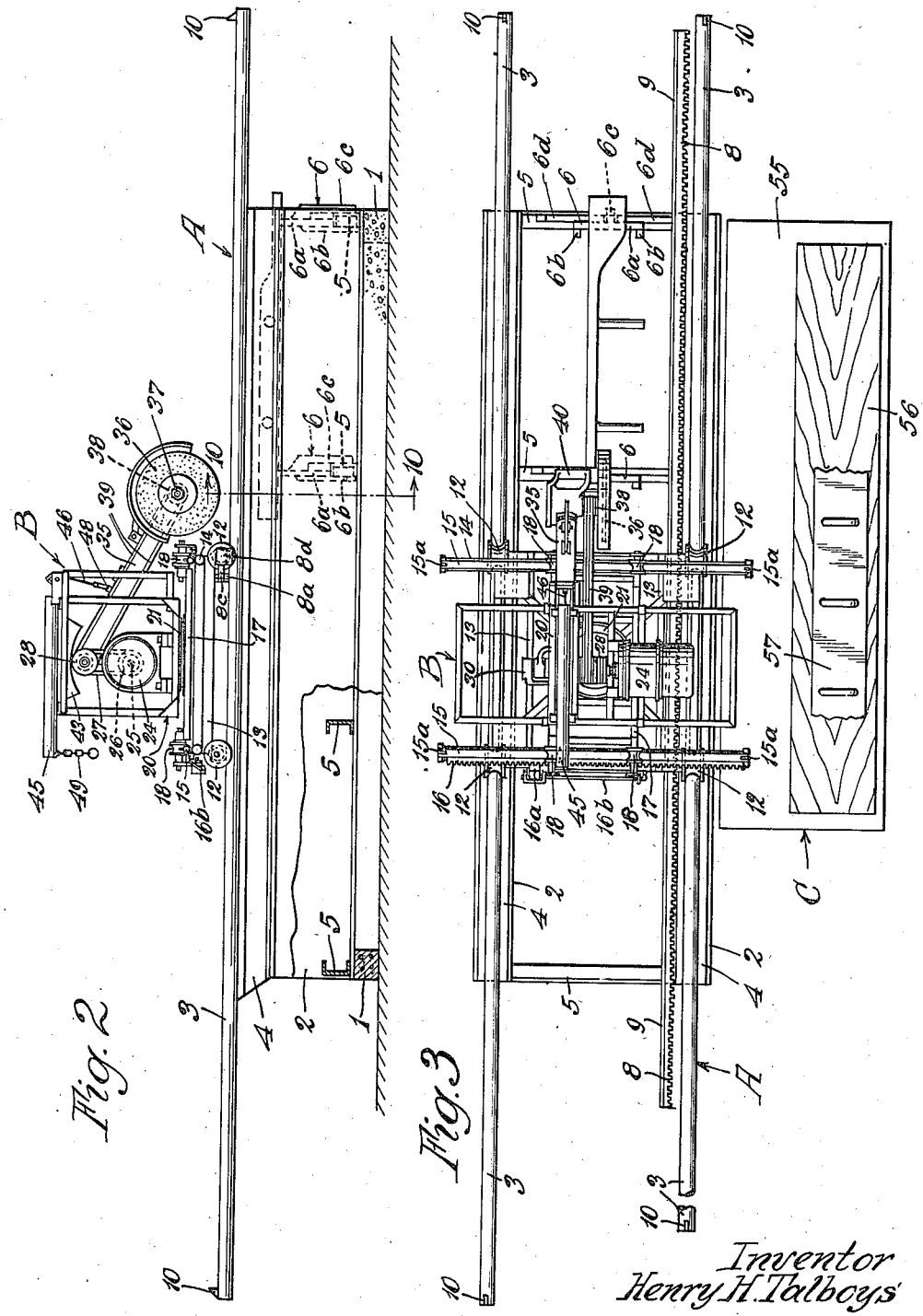

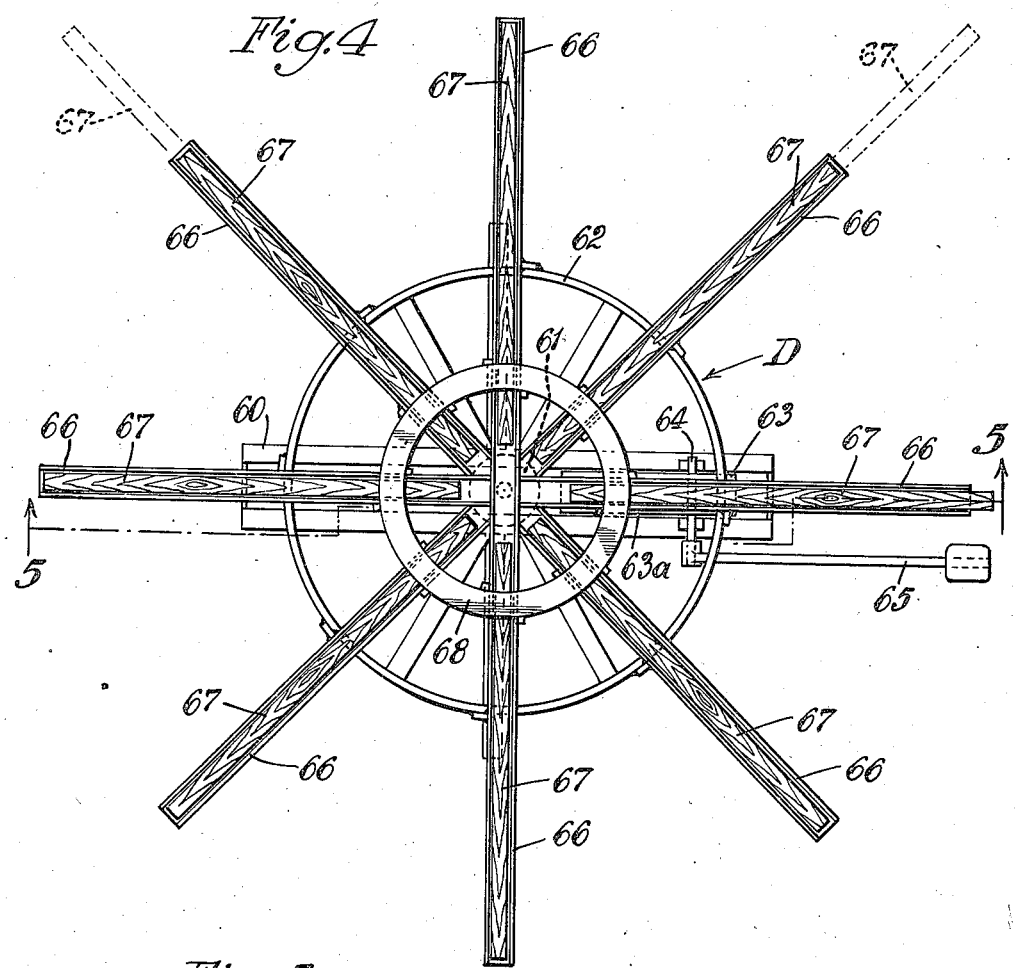
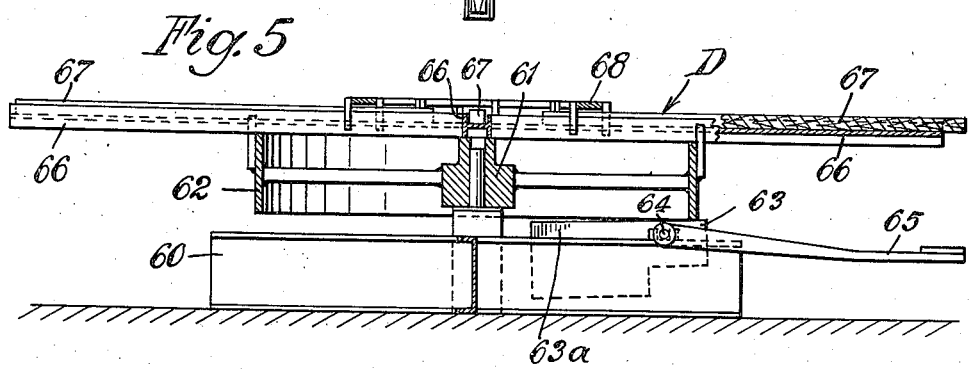

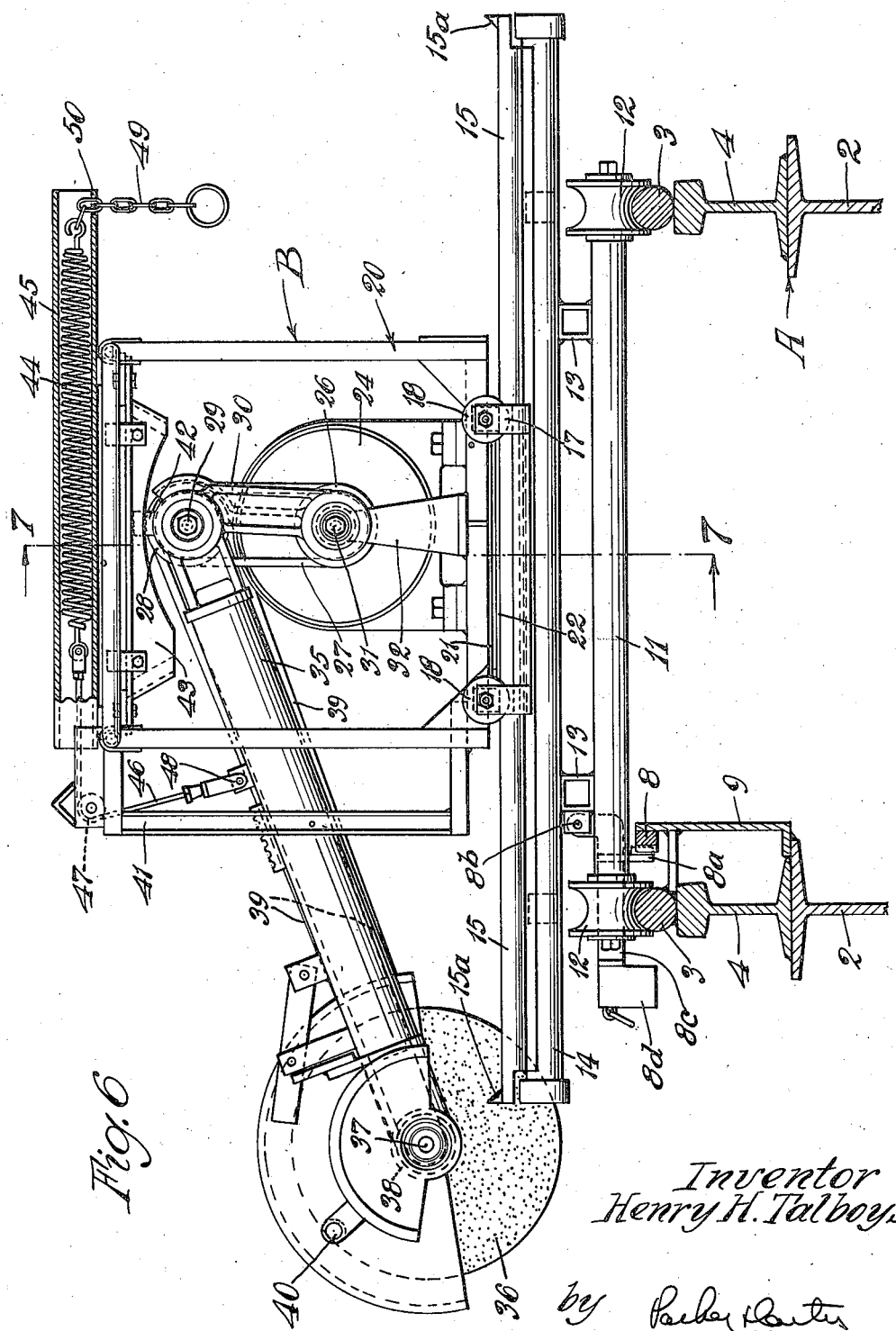

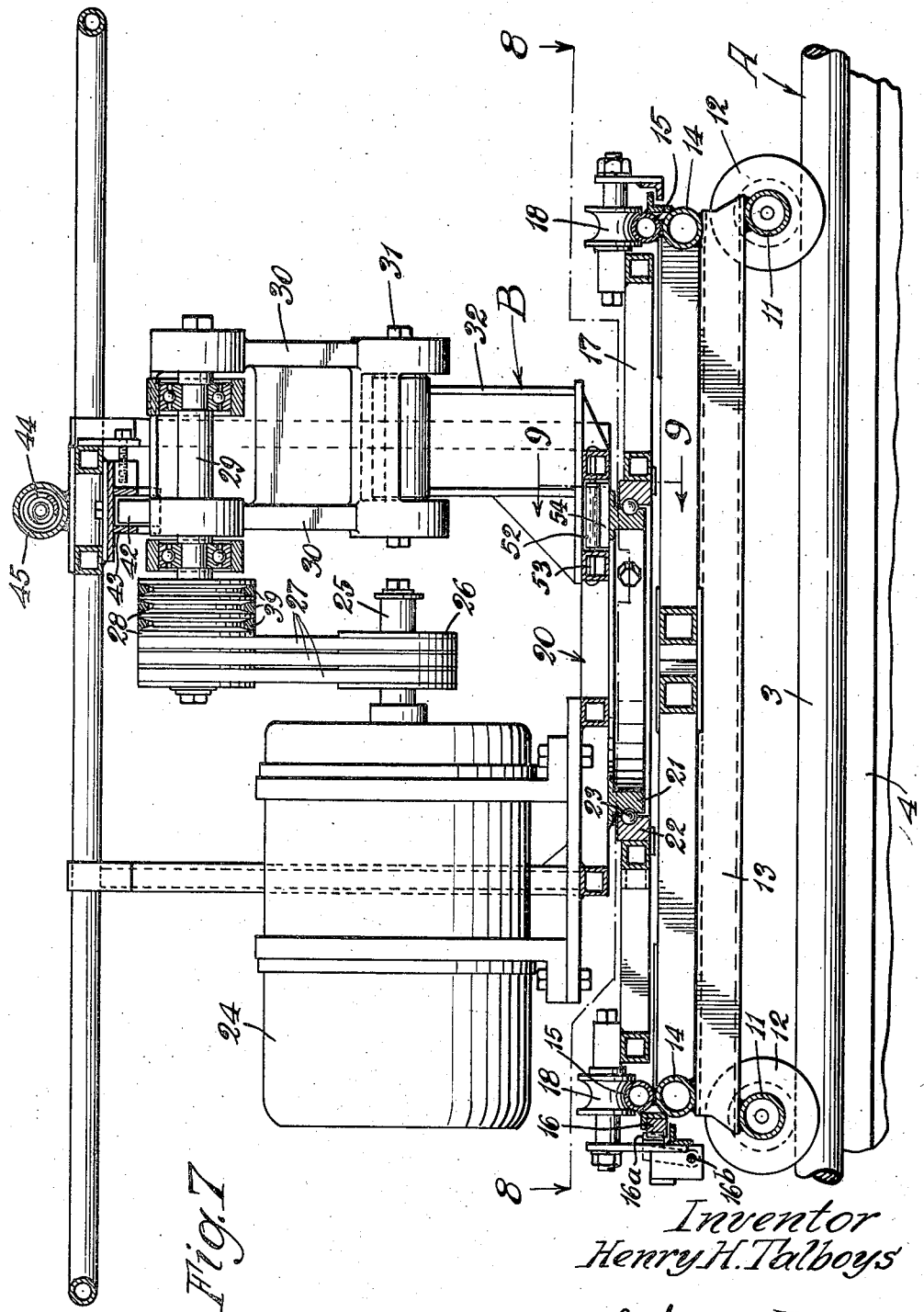

Inventor
Henry H. Talboys
by Barber & Barber
Attorneys

Patented Aug. 6, 1946

2,405,468

UNITED STATES PATENT OFFICE 2,405,468

FOUNDRY CUTOFF MACHINE

Henry H. Talboys, Milwaukee, Wis., assignor to Nordberg Manufacturing Company, Milwaukee, Wis., a corporation of Wisconsin Application January 28, 1943, Serial No. 473,812

6 Claims. (Cl. 51—105)

This invention relates to an improvement in machines for cutting articles, for example, metal castings. Another purpose of the invention is an improved method for trimming and cutting articles, for example metal castings. Another purpose is the provision of an improved installation for cutting or trimming articles, such as castings, of various sizes and shapes with maximum speed and minimum handling effort.

Another purpose is the provision of a flexible system and method for cutting or trimming articles of a variety of shapes.

Other purposes will appear from time to time throughout the specification and claims.

The invention is illustrated more or less diagrammatically in the accompanying drawings, wherein:

Figure 1 is a perspective view illustrating one form of the invention;

Figure 2 is a side elevation with parts in section of part of the structure shown in Figure 1;

Figure 3 is a plan view of the structure shown in Figure 2;

Figure 4 is a plan view of part of the structure shown in Figure 1;

Figure 5 is a section along the line 5—5 of Figure 4;

Figure 6 is a section on an enlarged scale along the line 6—6 of Figure 1;

Figure 7 is a section along the line 7—7 of Figure 6;

Figure 8 is a section along the line 8—8 of Figure 7;

Figure 9 is a section along the line 9—9 of Figure 7;

Figure 10 is a section along the line 10—10 of Figure 2;

Figure 11 is a section along the line 11—11 of Figure 10;

Figure 12 is a perspective view;

Figure 15 is a section along the line 15—15 of Figure 14.

Figure 13:
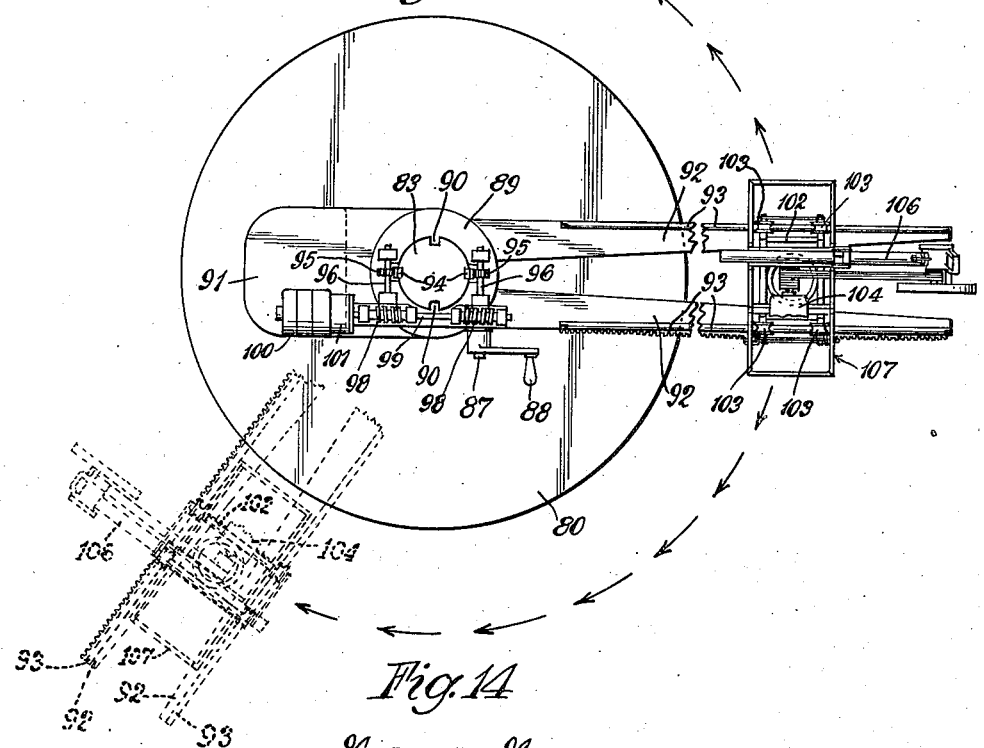
Figure 13 is a plan view of a variant form of the device.

Like parts are indicated by like characters throughout the specification and claims.

Referring to the drawings, and particularly to Figure 1, a structure is illustrated including main parts as follows:

A generally illustrates a supporting base which, as will appear from the other drawings, has work supporting means within it. B generally indicates a carriage and assembly longitudinally movable on the base A. C indicates a work support exterior to the base A and D indicates a second work support shown as adjacent one end of the base A.

Referring first to the base or assembly A, which is shown in some detail in Figures 2, 3 and 10, 1 indicates any suitable bottom portion, floor or the like, along which are shown as extending a pair of parallel I-beams 2, 2. The I-beams carry on their upper flanges any suitable work supporting rails 3, 3, herein shown as round and as mounted upon any suitable conventional rails 4. It will be understood, of course, that any suitable rails may be employed but the round rails mounted on the conventional I-shaped rails are in practice satisfactory.

The I-beams may be connected by any suitable transversely extending members 5, herein shown as channels upon which may be adjustably mounted work supports which will later be described in greater detail. They are indicated for example as at 6. It will be observed that the I-beams 2, are of sufficient height to permit pieces of substantial size to be positioned between them for accessibility to the cutting device which will later be described.

A rack 8 is shown as extending along one of the rails 3 and may be mounted, for example on a longitudinally extending element 9, suitably secured to one of the lower rails 4, or to an upper portion of one of the side frame members or I-beams 2. 10 indicates any proper end stops as shown in Figure 1 at each end of the round rails 3.

The structure generally indicated at B includes a carriage which is longitudinally movable along the rails 3 and a sub-carriage, transversely movable on the longitudinal carriage, a turntable rotated about a vertical axis on the sub-carriage and a cutter movably mounted on the turntable. The structure will now be described in greater detail.

The details of the carriage do not of themselves form part of the present invention. There is illustrated for example transversely extending frame elements 11, carrying at each end flanged wheels 12, appropriately formed to ride and move upon the round rails 3. Any suitable longitudinal extending frame members 13 may be employed which carry any suitable transversely extending cross frame members 14 and transversely extending tracks 15 having stop members 15a at each end. The main carriage may otherwise be strengthened by any intermediate members which do not form part of the present invention.

Adjacent one of the frame members 14 is a transversely extending track 15. Riding transversely on the tracks 15 is a sub-carriage, the frame of which is generally indicated as at 17. It carries in any suitable manner, flanged wheels 18 riding on the tracks 15.

Rotatably mounted on said sub-carriage is a turntable structure generally indicated as 20, mounted for rotation about a vertical axis by means, for example of the inner rails 21, outer rails 22 and the intervening rollers or balls 23. Mounted on the turntable is any suitable motor 24 which may be electric or otherwise but is herein shown as electric. Its rotor shaft 25 carries one or more pulley or pulleys 26 about which pass the belt or belts 27 to the driven pulleys 28. These pulleys are mounted on a shaft 29 which is rotatably mounted at the upper end of the connected links 30. These links are rotatable about an axis generally indicated at 31 which is preferably concentric with the axis of rotation of the rotor shaft 25.

32 indicates generally any suitable support, upwardly extending from the turntable structure 20, upon which the links 30 are rotatably positioned.

Rotatably mounted in any suitable manner in relation to the shaft 29 is the outwardly extending arm 35 upon the outer end of which is rotatably mounted any suitable cutting disk 36, rotatable with the shaft 37, which is rotated by means of a pulley 38, belts 39, and the pulley or pulleys 28. It will be understood that there is thus provided a flexible supporting means for the cutting element 36. The outer end of the arm 35 can be raised and lowered by rotating it about the shaft 29. The shaft 29 is itself mounted in the pivoted links 30 so that the arm 35 may be moved transversely, giving a great freedom of motion to the element. Any suitable manual handle 40 may be employed whereby the operator may radially manipulate the arm 35. The vertical movement of the arm 35 is guided by a pair of laterally spaced vertical frame members 41. The links 30 are guided in their rotary movement by an upward extension 42 which rides in an arcuate channel 43 as shown for example in Figures 6 and 7. The arm 35 is normally held in elevated position by means of a coil spring 44 in a tube 45. Connecting the coil spring with the arm is any suitable cable or flexible tension member 46 herein shown as passing around a sheave or pulley 47 and connected to the arm 35 as at 48. The strength of the raising impulse can be adjusted by means of the adjusting chain 49 secured to the opposite end of the spring 44 and which can be engaged at various positions in a slot 50 in the bottom of the outer end of the tube 45.

Any suitable means may be employed for locking the turntable at any desired position in relation to the sub-carriage, or if desired, the turntable may be permitted to rotate freely preferably with sufficient frictional resistance so that unintended rotation will not take place. As a locking means, there is illustrated for example a locking latch or lever 52 pivoted as at 53 to the turntable structure 20 and having a dependent end 54 adapted to penetrate between any suitable securing abutments 17a on the sub-carriage 17.

The sub-carriage is adjustable transversely across the rails in relation to the main carriage by means of the wheels 18, and rails 15 but it is generally desirable to lock the sub-carriage in relation to the main carriage. This locking action may be obtained for example by any suitable toothed securing dog 16a, pivoted as at 16b on the sub-carriage 17 and engageable with the rack 16, on the main carriage. Thus the sub-carriage may be locked at any desired position in relation to the main carriage or if desired the dog 16a may be left in released position.

The main carriage may be locked at any point along the rails 3 by means of a toothed latch 8a pivoted as at 8b on the main frame. 8c is an arm carrying a counterweight 8d which normally urges the member 8a into locking relationship with the member 8. Any suitable means may be provided for raising the arm 8c and releasing the carriage for movement along the rails 3.

As above mentioned, transverse supports 5 between the side frame members 2 may carry any suitable removable and preferably transversely adjustable support 6, whereby work elements of a large range of sizes and shapes can be accommodated between the members 2. When the user is operating on such members, the turntable is so turned as to position the arm 35 in parallelism with the rails. This position is shown for example in Figures 2 and 3. Then the operator by depressing the outer end of the arm 35 can engage the cutter 36 with the work. In this connection, it will be understood that the sub-carriage may be adjusted transversely in relation to the main carriage if necessary and the carriage as a whole may be moved along the rails 3. This permits the operator to engage the cutter 36 with the work at a wide range of positions and levels within the area defined by the side frame elements 2, 2.

As examples of practical work supports which may be adjusted across the members 5, there are illustrated in Figures 10, 11 and 12, supporting brackets which may include for example upright plates 6a having securing arms 6b, 6c for straddling the transverse supports 5. The bottom of the plate 6a may rest on the top of one of the members 5. Also lateral extensions 6d may be employed. It will be understood that a wide variety of shape of support may be employed whereby work parts of varying shape and size may be accommodated.

In many instances, it is desirable to support the work exteriorly to the space defined by the side frame elements 2, 2. In Figures 1 and 3, normally fixed exterior supporting means are illustrated. 55 indicates a base upon which an upper support 56 is mounted. The support 56 may be formed of any suitable shape and size and may for example be of wood so that the cutter 36 will not be injured when it passes through metal objects laid thereon. The member 56 is preferably movable on the base 55. 57 indicates a typical piece of work resting thereon.

It may also be desirable to provide movable supporting means D for supporting one or more work pieces which may be presented to the cutter 36 at a variety of angles or positions. As shown for example in Figures 1, 4 and 5, there is illustrated any suitable base 60 upon which is rotatable about a vertical axis a hub 61 carrying any suitable wheel or arm supporting structure 62. This movement may be controlled for example by a foot brake which includes a member 63 pivoted at 64 on the base 60 and normally gravitally urged into braking relationship with the wheel 62 by its inward extension 63a. 65 is any suitable foot lever whereby the brake may be moved into inoperative position. Generally radially extending from the hub 61 and mounted upon the wheel 62 are a plurality of channel members 66. Radially movable in these channel members are the radially extending elements 67, which if desired, may be of wood. They may be held against radial movement if desired or frictional resistance may be relied upon. It is desirable, however, to have the members 67 radially movable so that the effective radius of the rotary supporting table may be varied at will. The members 67 are preferably of wood and preferably extend above the edges of the channel 66, in order to prevent the cutter 36 from engaging the channels 66 after passing through the work. Any suitable central supporting ring 68 may also be employed if need be. 69 indicates typical work piece. It will be understood that the work pieces may be supported on the extension members 67 in any suitable manner. Cross pieces 70 may, for example, be loosely positioned in order to support the work, or the work may extend across to adjacent radial supports.

It will be understood that a plurality of work pieces if desired may be positioned on the rotary support above described and may be moved into the working zone where they can be reached by the cutter 36. If desired, a step by step feeding chain may be set up, the work being positioned on the turntable and progressively moved step by step into the cutting zone and then removed from the turntable after having been rotated beyond the cutting position. In any event, the fact that the work support may be rotated, taken in connection with the extensible adjustment of the member 67 and the adjustment of the main carriage, the sub-carriage and the turntable of the cutting device permits an adaptation of the device to cutting and trimming work pieces of a wide variety of sizes and shapes. If desired, more than one of the supports 55, 56 may be employed, for example they may be positioned at each side of the base members 2 or two or more of the rotary supports may be employed. But the combination shown in Figure 1 is practical and useful and permits a single cutting apparatus to operate in the base or defined by the members 2 and along one side and one end of the base area.

Broadly stated, it is practical to position work within and all the way around the exterior of the base area and because of the adjustability of the main carriage, the sub-carriage and the turntable, the work may be operated upon throughout said area. This is advantageous and a saving of labor and time as the work for example can be deposited at one side of the frame while work already deposited in working position is being operated on at the other side of the frame. A relatively small gang of men can thus operate rapidly upon a large mass of material.

A practical application of the device and method is to trim castings by cutting off gates, fins, etc., and in general trimming off waste portions of the metal and separating different parts of the castings where separation is desired.

Referring to the form of Figures 13, 14 and 15, 80 indicates any suitable base resting for example on the floor surface 81. Upwardly extending from the base is a variant sleeve 82 which receives a bottom portion of the vertical shaft 83. Any suitable bearing means may be provided, for example, the bottom supporting rollers 84. The lower portion of the shaft 83 within the sleeve 82 may be provided with any suitable means for rotating it. There is illustrated for example a circumferential angular worm gear 85 in mesh with a worm 86 on any suitable shaft 87 which may be rotated by any suitable means, for example the manually operable handle 88. It is understood that any other driving means may be employed if desired. Mounted on the shaft 83 is a vertically movable carriage 89 which may be keyed or splined as at 90 to permit it to be raised and lowered on the shaft 83 while rotation is prevented.

The carriage 89 is provided with a counterweight 91 and a pair of generally radially extending but laterally spaced arms 92 carrying parallel track rails 93. The carriage structure may be raised or lowered with or on the shaft 83 in any suitable manner. There is illustrated, however, a pair of racks 94 on the shaft 83, these racks being in mesh with pinions 95 on shafts 96 carrying worm gears 97 in mesh with worms 98 on a shaft 99 driven by any suitable motor means 100, through a gear reduction 101. This structure is illustrative of means for raising and lowering the carriage 89.

Movable along the rails 93 is a sub-carriage generally indicated as 102 which may ride, for example on wheels 103. 104 is any suitable motor which may drive the cutting element 105 mounted on an arm 106. The details of the arm are not shown in Figures 13 and 14 but may be substantially the same as the structure shown in Figures 1 and following. It will be understood that the motor 104 and the arm 106 are mounted on a turntable 107 corresponding to the turntable shown in detail for example in Figure 7.

In the use of the device the shaft 83, and with it the arms 92, may be rotated throughout a complete circle. The carriage 89 may be raised and lowered vertically in relation to the base 80. The sub-carriage 102 may be moved toward and away from the vertical axis of the shaft 83. The motor 104 and the cutter 105 may be moved in relation to the carriage 102 just like the corresponding motor and cutter of Figures 1, 6 and 7.

Figure 14:
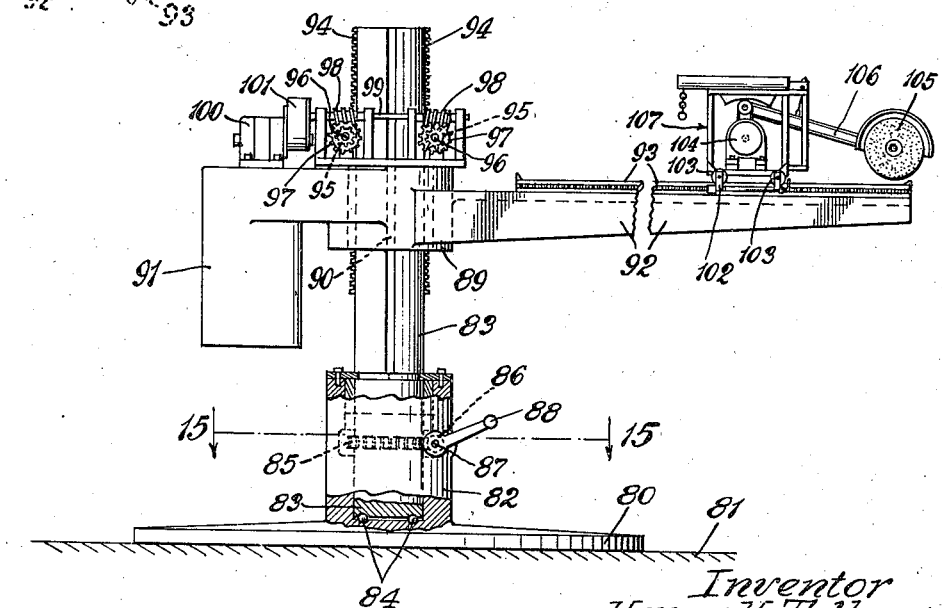
Figure 14 is a side elevation with parts in section of the view shown in Figure 13.

It will be realized for example in the form shown in Figures 13, 14 and 15, that any suitable work supporting means may be employed for supporting the work at various points about the vertical axis of rotation of the cutting assembly and at various levels in relation to the base or supporting surface.

It will be realized that while I have shown and described an operating device, still many changes in shape, size, arrangement, number and disposition of the parts may be made without departing materially from the spirit of my invention. I wish, therefore, that the showing be taken as in a large sense illustrative and diagrammatic.

The use and operation of the device are as follows:

There is provided herein a method of and an apparatus for trimming or cutting metal parts, for example, castings, which permits of the rapid trimming of a large number of parts and the use of a substantial area for the receiving, operating upon and removal of the trimmed parts.

In the form of Figures 1 and following, there is illustrated a practical exemplification of the device and an illustration of the mechanism adapted for carrying out the above mentioned method in which the main carriage, and all the parts mounted thereon, is longitudinally movable or adjustable along a work area. This permits the cutter to adapt itself or to be opposed to parts located throughout a very substantial floor area. The transverse adjustability of the main carriage and the sub-carriage and the provision of a turntable with the cutting member movably mounted on it, permits wide variations of the angle of approach of the cutter to the work. This, in connection with a highly flexible supporting means and method, enables a single cutter operated by a single man to operate upon a very large volume of work.

In the form of Figures 13 and 14, a variation is provided in which the main carriage instead of being longitudinally adjustable also is itself rotatable about a vertical axis and performs the dual function of main carriage and turntable.

It will be understood, of course, that the structure of Figures 13, 14 and 15 may be varied without departing from the spirit of the invention. For example, the shaft 83 may be raised and lowered bodily for example by hydraulic means and the carriage 89 might then be rotated in relation to the shaft. What is important is that means are provided (a) for raising and lowering the cutter structure as a whole; (b) for rotating the cutter structure as a whole about a vertical axis; (c) for moving the cutter structure as a whole radially toward and away from such axis; and (d) for rotating the cutter structure and motor about the vertical axis parallel to the axis of the shaft 83 but adjustable toward and away from it, for example by movement of the sub-carriage 102.

The result is the provision of a flexible and efficient means for cutting parts, for example of metal, arranged over a substantial floor area and located at various levels on the floor area.

I claim:

1. In a castings trimmer, a base, an elevator mounted on said base, a radially extending carriage track mounted on said elevator and rotatably adjustable about the axis of the base, a carriage radially movable on said track, a turntable on said carriage, a cutter supporting arm mounted on said turntable for rotation about a generally horizontal axis, a horizontally axised rotary cutter on said arm and means for driving it, and means for supporting the castings to be trimmed.

2. In a castings trimmer, a castings support including supporting elements adapted to receive castings, a track including parallel rails located along opposite sides of said support, said rails being located at a level substantially above the level of said supporting elements, a carriage movable along said rails, means for locking said carriage against movement along said rails, a sub-carriage transversely movable on said carriage, the path of movement of said sub-carriage extending above said supporting members, means for locking said carriage against transverse movement in relation to said carriage, a turntable mounted on said sub-carriage and movable therewith, an arm movably mounted on said turntable, a rotary cutter at the end of said arm, mounted for rotation thereon and means for rotating said cutter, the end of said arm, and said cutter, being freely movable to a level substantially below the level of said carriage and sub-carriage, and substantially below the level of said track.

3. In a castings trimmer, a pair of generally parallel, horizontally extending side elements defining between them a castings receiving space, castings supports, within said space, extending between said side elements, adapted to receive the castings to be trimmed, said supports including removable casting supporting members of different heights, a carriage movably supported on said side members, at a level above the casting supports, for longitudinal movement along said side members, a sub-carriage transversely movable on said carriage, a turntable on said sub-carriage, an arm rotatable on said turntable about a generally horizontal axis, a rotary cutter on the end of said arm, and means for rotating it, the end of the arm and the cutter being freely movable into the space between said side members, for cutting engagement of the cutter with the castings.

4. In a castings trimmer, a pair of generally parallel, horizontally extending side elements defining between them a castings receiving space, castings supports, within said space extending between said side elements, adapted to receive the castings to be trimmed, said supports including transversely extending guide and supporting elements and castings contacting elements slidably transversely movable thereon and readily removable therefrom, a carriage movably supported on said side members, at a level above the casting supports, for longitudinal movement along said side members, a sub-carriage transversely movable on said carriage, a turntable on said sub-carriage, an arm rotatable on said turntable about a generally horizontal axis, a rotary cutter on the end of said arm, and means for rotating it, the end of the arm and the cutter being freely movable into the space between said side members, for cutting engagement of the cutter with the castings.

5. In a castings trimmer, a pair of generally parallel, horizontally extending side elements defining between them a castings receiving space, castings supports, within said space extending between said side elements, adapted to receive the castings to be trimmed, said supports including transversely extending guide and supporting elements and castings contacting elements slidably transversely movable thereon and readily removable therefrom, said castings contacting elements having portions of various heights, a carriage movably supported on said side members, at a level above the casting supports, for longitudinal movement along said side members, a sub-carriage transversely movable on said carriage, a turntable on said sub-carriage, an arm rotatable on said turntable about a generally horizontal axis, a rotary cutter on the end of said arm, and means for rotating it, the end of the arm and the cutter being freely movable into the space between said side members, for cutting engagement of the cutter with the castings.

6. In a castings trimmer, a pair of generally parallel horizontally extending side frame members defining between them a castings receiving space, a plurality of fixed guide supports extending in parallel between said side elements at a level substantially below the top of said side elements and having upper edges adapted to serve as castings supports, and removable castings engaging elements adjustable transversely on said fixed supports and upwardly removable therefrom, said castings engaging elements having portions of different heights, adapted for accommodation of castings of different sizes, a castings cutting assembly mounted on and movable longitudinally along said side frame members, including a flexibly mounted cutting arm and a rotatable cutter thereon, and means for rotating said cutter.

HENRY H. TALBOYS.